July 17, 1934.  L. N. CRICHTON ET AL  1,966,439
PROTECTIVE SYSTEM
Filed Sept. 18, 1929
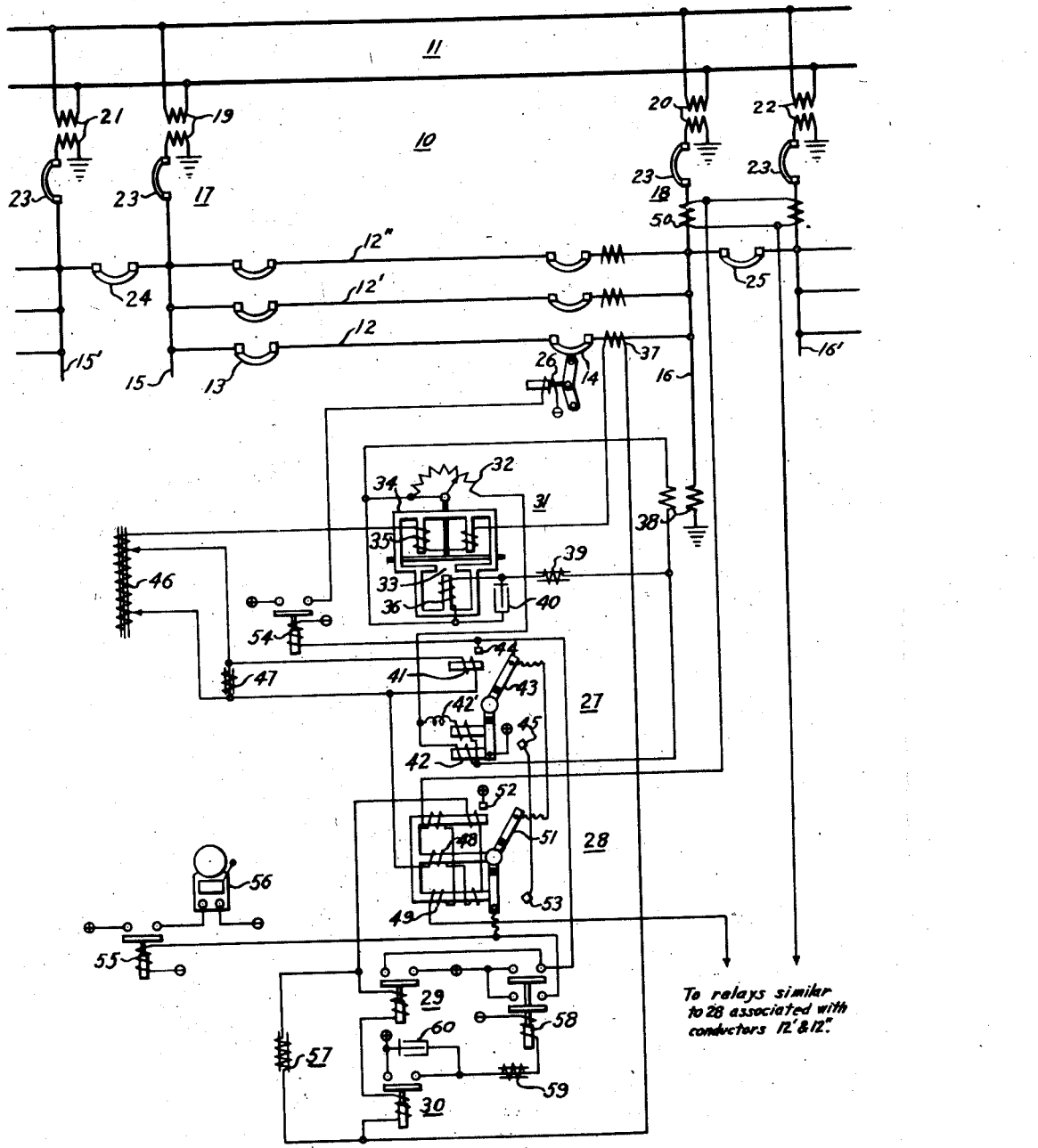
INVENTORS
Leslie N. Crichton,
Herbert C. Graves &
Merrick R. Feldman
BY
ATTORNEY Patented July 17, 1934

1,966,439

UNITED STATES PATENT OFFICE 1,966,439

PROTECTIVE SYSTEM

Leslie N. Crichton, East Orange, N. J., Herbert C. Graves, Upper Darby, Pa., and Merrick R. Feldmann, Nutley, N. J., assignors to Westinghouse Electric and Manufacturing Company, a corporation of Pennsylvania Application September 18, 1929, Serial No. 393,432

31 Claims. (Cl. 175—294)

Our invention relates, in general, to protective equipment for electrical distribution systems and, more particularly, to equipment of the type mentioned for use in electric-railway distribution systems of the single-phase type, although the invention is not limited to such use.

The system of our invention is applicable, especially, to distribution systems for multi-track electric railways in which a plurality of trolley conductors are connected in parallel between the busbars of spaced transformer stations. It is usual, in systems of this type, to supply energy to the sub-station transformers from a high-tension transmission line located in the neighborhood of the railway track.

The principal object of our invention is to provide a protective system which shall insure prompt tripping of sectionalizing circuit breakers in a faulty feeder circuit, so that the latter may be isolated from its energy sources (the sub-station busbars) without unnecessary delay. Prompt action is necessary, in such cases, in order to protect generating and transforming equipment connected to the system, as well as to obviate interference with neighboring communication circuits.

It is a further object of our invention to provide a system of the type described which shall operate to trip only the circuit breakers in the faulty conductor, leaving all other conductors connected to their energy sources so that unnecessary interruptions in service may be avoided.

It is a further object of our invention to provide means whereby the effect of load currents on the operation of the protective equipment will be compensated.

Further objects and advantages of our invention will become apparent from the details incorporated in the following description.

To obtain a complete understanding of our invention, it will be necessary to refer to the accompanying drawing, the single figure of which illustrates diagrammatically one modification of the protective system of our invention.

Referring particularly to the drawing, a multi-track-railway distribution system is illustrated at 10, comprising a high-voltage transmission line 11 and a plurality of trolley conductors 12, 12' and 12'', connected through circuit breakers, such as 13 and 14, to sub-station busbars 15 and 16 at transformer stations 17 and 18. At the transformer stations 17 and 18, busbars 15 and 16, and similar busbars 15' and 16' associated with adjoining sections terminating at the stations 17 and 18, are energized from the sub-station transformers 19, 20, 21 and 22. The transformer circuit breakers are indicated at 23. Bus-tie breakers are shown at 24 and 25.

The protective equipment for controlling the operation of the transformer and the bus-tie circuit breakers may be any one of several systems well known for this purpose.

The novel feature of our invention resides in the details of the protective equipment which we provide for controlling the operation of the trolley breakers, such as 13 and 14, which are preferably of the so-called high-speed type.

For the sake of simplicity, the operating mechanism and control equipment for only one trolley breaker 14 has been shown in detail, but it is to be understood that similar equipment is to be provided for the control of all other trolley breakers. The protective apparatus for the circuit interrupter 14, which is adapted to be tripped open by a trip coil 26, includes an impedance relay 27, a directional relay 28 and over-current relays 29 and 30. All of the relays mentioned are instantaneous in operation, that is to say, no external electro-magnetic or mechanical time delay means are utilized. The operating time is in the neighborhood of .01 second which corresponds to a quarter-cycle of the usual 25-cycle power current. The use of instantaneous relays is essential, as pointed out above, because of the necessity for prompt isolation of a fault on any trolley conductor.

In addition to the relays above mentioned, we provide a so-called load-presetting device 31. The function of this device, as its name indicates, is to set or adjust the instantaneous impedance relay in accordance with the load current traversing the conductor 12. It will be apparent that, at times of heavy load, the occurrence of a high-impedance fault might reduce the impedance of the load circuit sufficiently to cause the operation of the impedance relay. In accordance with our invention, however, we provide a presetting element which effects a graduated adjustment of the impedance relay setting, in accordance with the load current so that, at times of heavy load, a greater restraining effect is exerted upon the armature thereof as will be described in greater detail hereinafter, to prevent the tripping of the circuit interrupter 14.

The load-presetting element 31 takes the form of an automatically adjustable impedance which is arranged to be connected in the circuit of the restraining windings of the impedance relay 27 which will be referred to later. This impedance, such as the rheostat or variable resistor 32, is adapted to be actuated by the moving element of a volt-ampere relay 33, of the induction type, which comprises a magnetic core 34 and current and potential windings 35 and 36.

The current windings 35 are energized from a current transformer 37 which has its primary winding in series with the conductor 12. The potential winding 36 of the presetting element 31 is energized from the secondary winding of a potential transformer 38, the primary of which is connected between the sub-station bus 16 and ground. A series reactor 39 and a shunting capacitor 40 are associated with the potential winding 36 of the presetting element 31, for the purpose of affecting the phase relation of the current traversing the voltage and current windings, respectively, so that the motor element of the presetting device, comprising the electromagnetic windings, core and usual induction disc, will exert the maximum torque on the contact member of the rheostat 32 when the phase angle between the voltage of the conductor 12 and the current therethrough is 60°. This angle is the natural impedance angle of the trolley conductor 12 on short circuit.

It will thus be seen that the volt-ampere relay 33 responds to the component of the load current in phase with the fault current, so that the impedance relay, which responds to the vectorial sum of the load and fault currents, may be made to measure substantially only the impedance of the fault, thus insuring that the balance point at which the impedance, or distance-responsive, relay operates will not be materially changed by the amount of load. As the load power factor of a single-phase series-motor railroad system is poor, a very close approximation is thus obtained.

The volt-ampere relay 33, being of the induction-disk type, is inherently a very slowly moving relay, so that it may be regarded as stationary during the quarter of a cycle required for the instantaneous impedance and directional relays 27 and 28 to operate and the additional cycle or two required by the circuit breaker 14.

The impedance relay 27 is similar, in some respects, to relays of this class now known but differs therefrom in structure and in its operational effects. As is well understood, the impedance relay, as disclosed in U. S. Patent No. 1,292,584, comprises a current-responsive actuating winding, a voltage-responsive restraining winding and a contact-making device jointly controlled thereby. The relay 27 includes two independent magnetic circuits which are adapted to be excited, respectively, by current and voltage windings 41 and 42.

A V-shaped armature 43 is adapted to be controlled jointly by the excitation of these magnetic circuits and, when actuated, engages fixed contacts 44 and 45. The current winding 41 of the impedance relay 27 is connected in series with the current winding 35 of the load-presetting element 31, and the two windings are connected in parallel with a current-balance auto-transformer 46 which is provided for the purpose of making adjustments of the setting of the impedance relay. In addition to the auto-transformer 46, the current winding 41 of relay 27 is shunted by an impedance 47, constituting a so-called transient shunt which is the subject of the copending application of Leslie N. Crichton, Serial No. 422,965, filed January 23, 1930.

As pointed out in said application, it is the function of the transient shunt to bypass the direct-current component of an asymmetric fault current so that the operation of the impedance relay 27 will be responsive to the correct value of the impedance of the feeder circuit and not to the abnormal transient current resulting from an asymmetric fault.

The voltage winding 42 of the relay 27 is divided into two portions which are connected in parallel across the secondary winding of the potential transformer 38 in series with the rheostat 32. A small impedance 42' is connected in series with one of the portions of the winding 42. As mentioned hereinabove, the function of the load-presetting element 31 is to actuate the rheostat 32 so that, when an increased load is placed upon the trolley conductor 12, the restraining effect of the voltage winding 42 of the relay 27 will be increased to prevent tripping of the sectionalizing breakers 13 and 14 until the occurrence of an actual fault on the circuit of such low impedance that it is accompanied by a marked reduction of the line voltage and, consequently, of the effect of the voltage-responsive restraining winding. The rheostat 32 and the relay 33 are, of course, constructed so that, as the current traversing the winding 35 of the device 31 increases, the resistance in series with the voltage winding 42 of the relay 27 will be decreased.

The purpose of dividing the voltage winding 42 into two portions and providing a series impedance for one of said portions is merely to insure that, under no circumstances, will the restraining flux be reduced to zero so long as any voltage exists on the bus 16. The series impedance serves to shift the phase of the current through one portion of the winding so that magnetomotive force of both portions of the winding will not reach zero at the same instant. This produces the same effect as the well known shading coil used in alternating-current relays. The impedance relay is thus made more positive in action and less subject to false operation.

The directional relay 28 comprises a plurality of current windings and a common, three-limbed magnetic structure adapted to cooperate therewith. One of the current windings is illustrated at 48 and is divided into three portions, which are distributed on the limbs of the magnetic circuit. This winding is connected in series with the current windings 35 and 41 of the presetting device 31 and the impedance relay 27, respectively. The other winding 49 of the directional relay 28 is divided into two portions for cooperation with the outer limbs of the magnetic circuit. This winding is connected across a current transformer 50, the primary winding of which is in series with the sub-station bus 16. The windings of additional directional relays for the remaining conductors, similar to 12, are connected in series with the winding 49 of the relay 28.

The purpose of disposing portions of the winding 48 on the outer arms of the magnetic structure of the directional relay 28 is to prevent false operation of this relay because of any slight phase angle that might exist between the currents traversing the windings 48 and 49. It is obvious that the power factor of the input to the substation bus 16 from the transformers 20 and 22 may differ from that of the input to the bus from trolley 12 in the event of the short-circuit on trolley 12' or trolley 12'' because of the differences in construction and length of the two paths, so that a slight phase displacement between the currents energizing the windings of relay 28 may be experienced. The resultant flux produced by outof-phase currents traversing windings 48 and 49 has been found to cause a vibrating action of the armature 51 tending to close the contacts of the relay during part of a cycle when the direction of energy flow was such as to require the contacts to remain open and the extra turns in the winding 48 were placed on the outer arms of the structure of the relay to provide a small opposing force to restrain the above-described vibratory motion of the armature of the directional relay 28. When the direction of energy flow in the trolley conductor 12 reverses from its normal direction, that is, when it is toward the bus 16, the effect of the operations of the windings 48 on the outer members of the relay 28 is to prevent closing of the relay contacts.

The relay 28 is provided with a pivoted V-shaped armature 51 which is adapted, when the phase positions and magnitudes of the currents traversing the windings 48 and 49 have a predetermined relation, to engage fixed contacts 52 and 53. The windings 48 and 49 of the directional relay 28 are so designed and connected that, when the currents in the two windings are substantially in phase, as they will be when energy flows in the normal direction, i. e. from bus to trolley, the relay will close its contacts at and above a predetermined magnitude of current. If the instantaneous polarities of the currents are reversed with respect to each other, as they will be when energy flows from trolley to bus because of a fault on an adjacent trolley, for example, the relay will not close its contacts at any value of current in the windings 48 and 49.

These characteristics of the directional relay 28 cause it to trip only when energy flows through the conductor 12 in the normal direction. Since, under normal conditions, the energy flow is from the bus 16 to the load in contact with the conductor 12, the relay 28 will normally be tripped if the load current is of sufficient magnitude.

Upon the occurrence of a fault on the conductor 12, the energy will flow in the normal direction from the bus to the fault on the conductor 12. In the adjacent conductors connected in parallel with the conductor 12, however, the normal flow of energy will be reversed and the direction of flow will be from the conductor to the bus and thence from the bus to the fault. It will thus be apparent that, when a fault occurs on one conductor, the directional relay, similar to that shown at 28, associated with said conductor, will be tripped, while the directional relays associated with the other parallel conductors will not be tripped. Conversely, under normal conditions, the directional relays of all the parallel-connected conductors will be tripped, but the several impedance relays will remain unoperated.

According to our invention, we make use of the principles described and explained hereinabove for controlling the energization of the tripping coil 26 of the circuit breaker 14. The impedance relay 27, as has been explained, is responsive to the impedance of the conductor 12, and the directional relay 28 operates only when energy flows through the conductor 12 in the normal direction. When the flow of current through the conductor 12 and the decrease in the voltage thereof indicate the occurrence of a fault of a predetermined severity, that is to say, of a predetermined value of circuit impedance, the relay 27 is operated and, because the flow of energy through the conductor 12 is in the normal direction, the relay 28 is likewise operated.

We propose to control the energization of the tripping coil 26 of the circuit breaker 14 by the joint operation of the impedance relay 27 and the directional relay 28 and, to this end, we connect the contacts of said relays in series with the winding of a tripping relay 54. When the relays 27 and 28 are simultaneously operated, a circuit is completed from positive battery terminal + to the fixed contact 52 of the relay 28, through moving contact carried by the armature 51 thereof, the moving contacts carried by the armature 43 of the relay 27, the fixed contact 44 adapted to cooperate therewith and the winding of the relay 54, to negative battery terminal —.

The resulting operation of the relay 54 completes an obvious energizing circuit for the tripping coil 26 of the circuit breaker 14 to cause the tripping of the latter and the isolation of the conductor 12 from the sub-station bus 14. The tripping of the circuit breaker 13 is effected simultaneously by similar protective relays not shown.

As explained heretofore, the relays 27 and 28 operate simultaneously only upon the occurrence of a fault on the conductor 12. Upon the occurrence of a fault on any other conductor, even though the impedance relay 27 might conceivably be operated, the directional relay 28 will not be operated, because the flow of energy will be from the conductor 12 to the bus 16 and thence to the fault, which direction is opposite to the normal direction of energy flow and, in accordance with the previous explanation, prevents the operation of the relay 28.

The relays 27 and 28 also control a circuit for an alarm relay 55 which, when energized, closes an obvious energizing circuit for a gong 56 or other equivalent alarm device, or a protective device, such as a lockout relay, to prevent reclosing of the circuit breaker 14 except by hand.

In addition to the impedance relay 27 and the directional relay 28, we provide the over-current relays 29 and 30 for effecting the tripping of the circuit breaker 14 upon the occurrence of special conditions to be described hereinafter. The windings of these relays are connected in series with those of the impedance and directional relays and are shunted by a transient shunt 57 similar to that shown at 47. The relay 29 is an instantaneous over-current relay and, when energized, closes an obvious energizing circuit for the tripping relay 54. The relay 30 is also an instantaneous over-current relay which controls the circuit-breaker-tripping relay 54 through an auxiliary relay 58. When the relay 30 operates, it completes a circuit through a reactor 59 for the relay 58. Because of the inductance of this circuit, a short time interval is required for the current to build up therein to the value required to operate the relay 58. This interval is about .05 sec. or 1¼ cycles of the 25-cycle power current. A condenser 60 is provided to reduce arcing at the contacts of the relay 30. When the relay 58 finally operates in response to the tripping of the relay 30, an obvious energizing circuit is completed for the circuit-breaker-tripping relay 54 and the alarm relay 55, so that the results effected thereby are the same as those accomplished by the simultaneous operation of the impedance and directional relays. A slight time interval is thus interposed between the operation of the relay 30 and the tripping of the circuit breaker 14.

Usually, it will be advisable to set the relay 29 to trip at a higher value of load current than the relay 30. By this means, it is possible to cause immediate tripping of the circuit breaker 14 upon the existence of a line current larger than any possible load current, in which case, discrimination between load and fault currents is unnecessary, as well as selectivity as to the location of the fault and, at the same time, to effect tripping upon the occurrence of a smaller overload if it persists for a predetermined period, and the impedance and directional relays fail to trip the breaker.

The importance of the function performed by the instantaneous over-current relays may best be explained by stating that, because of inherent limitations, the accuracy of the impedance relay 27 cannot be made such that it will distinguish between faults occurring on adjoining sections of a trolley conductor within a small distance of a transformer station. It will be obvious that the impedance of a fault occurring on the conductor 12 close to the bus 15 will be substantially the same, as measured by the impedance relay 28, as that of a fault occurring on the corresponding conductor connected to the bus 15'. If the relay 27 were adjusted to trip upon the occurrence of a fault close to the bus 15, it would also trip on the occurrence of a fault close to the bus 15', so that the selective feature, according to which only circuit breakers in faulty lines are opened, would be lost.

In order to prevent this condition, the impedance relay 27 is adjusted to operate only when a fault of a predetermined value of impedance occurs within 90% of the distance from the station 18 to the station 17. The relay 27, therefore, will not respond to a fault having an impedance below the relay setting if it occurs within a space 10% of the station-to-station distance from the station 17.

The instantaneous over-current relays 29 and 30 are relied on to afford "back-up" protection for this small portion of the station-to-station distance. Considering a fault on the conductor 12 close to the bus 15, the impedance relay 27 will not operate to trip the breaker 14. The corresponding relay at the other end of the section, however, will operate to trip the circuit breaker 13. After the tripping of the circuit breaker 13, the whole of the energy supplied to the fault traverses the circuit breaker 14 and, of course, affects the operation of the relays associated therewith. As stated previously, the impedance relay 27 does not respond. The over-current relays, however, operate to bring about the tripping of the circuit breaker 14. It is obvious, of course, that, in any case of a fault on a trolley conductor which produces a line current greater than the setting of the over-current relays 29 and 30, the latter tend to close their contacts but, because of the relatively slow response which characterizes their operation, particularly the operation of the relays 30—58, as compared with that of the instantaneous impedance relay 27, the latter effects the tripping of the circuit breaker in the faulty conductor before the over-current relays have operated.

In the case under consideration, however, namely, where the circuit breaker at one end of a faulty section has tripped as a result of the operation of the impedance relay at that end, and the impedance of the fault circuit is too high to permit the impedance relay at the other end of the section to trip, the instantaneous relays at the other end operate to isolate the faulty conductor from its remaining source of energy. It will be apparent that the combination of impedance and over-current relays described will take care of a fault condition of any type although, in certain cases, for example, the one just described, the circuit breakers at the ends of a faulty section will not trip simultaneously but will operate sequentially. This method of operation is undesirable but can be tolerated if it results only from faults occurring within 10% of the station-to-station distance from each station, since faults in this area will be only 10% of the total number of faults in the section.

Whenever the trolley-conductor fault occurs within the middle eight-tenths of the station-to-station distance, the impedance relays at both ends thereof operate, if the fault has an impedance below the relay setting, to trip the breakers at the ends of the sections simultaneously and thus isolate the faulty conductor completely within a very short space of time, preventing or, at least, largely avoiding, interference with neighboring communication circuits.

By means of the arrangement described in the preceding paragraph, the desirable feature of extreme selectivity is retained while the disadvantage of occasional sequential operation of sectionalizing circuit breakers is limited to a very small percentage of the possible fault conditions.

Among the desirable characteristics of the protective system we have shown and described hereinabove are the following advantageous features which we consider very important to the protective relay art. In the first place, a change in the amount of generating capacity available for supplying energy to the fault condition does not necessitate any change in the settings of the various relays. The magnitude of the load on the system at the time of fault, furthermore, has no effect on the operation of the relays, since the influence of the load is fully compensated by the so-called load presetting device. Another inherent feature of our invention is that the impedance relay will operate even upon the occurrence of a fault which causes a flow of current less than the safe permissible full load current if the faul impedance is below the relay setting. The impedance relay on the other hand will not operate on loads of impedance higher than the light-load relay setting even though the resulting current is greater than the short-circuit current. This discrimination is made possible because the impedance relay actually measures the impedance of the circuit to which energy is supplied. In the case of a fault, this impedance is low in most cases whereas, in the case of a load, the impedance is of considerable value.

One of the most important features of our invention is that a very high speed of operation may be obtained by the system we have disclosed. The importance of this feature has been mentioned before and it is worth repeating that the relays disclosed herein operate in most cases in less than a quarter-cycle after the occurrence of a fault. This high-speed relay operation, in combination with the high-speed circuit breakers mentioned above, constitutes a protective system which will completely isolate a fault within a very few cycles of the occurrence thereof. The marked effect of this high-speed operation of the stability of interconnected systems and the general efficiency thereof will be apparent to those skilled in the art.

Our system is also characterized by the fact that a faulty section of a trolley conductor is positively selected and all other sound conductors remain unaffected. Our system also provides simultaneous operation of the circuit breakers at the ends of a section of trolley conductor for all faults occurring in the middle 80 per cent of the length of the section.

Incidental advantages of the system we have disclosed include the fact that the protective apparatus employed is characterized by a very low power consumption so that there is only a moderate burden on the current transformers at all loads. Our system may be extended and amplified further within the limit of current-transformer load capacity without affecting the operation of the system in any way.

It will be apparent from the foregoing description and explanation that we have provided a relay system which will accomplish the objects and possess the advantages mentioned at the outset of this description. It will also be apparent that numerous changes in the system we have disclosed will occur to those skilled in the art. As an example, it might be possible to substitute a variable impedance connected in parallel with the restraining coil of the impedance relay 27 for the series rheostat, or the functions of these devices could be combined in a single structure, as will be obvious to those familiar with such matters. Since additional changes may be desirable to fit the system of our invention for application to particular problems, we do not intend to be limited to the disclosure herein made, except as necessitated by the appended claims.

We claim as our invention:

1. In a protective system, a circuit interrupter for isolating one of a plurality of parallel-connected conductors, a relay responsive to the impedance of said one conductor, a relay responsive to the direction of energy flow through said conductor, means jointly controlled by said relays for isolating said conductor upon the occurrence of a fault thereon, and an instantaneous overcurrent relay for further controlling said means.

2. The combination with one of a plurality of parallel-connected conductors in an electric distribution system and a circuit interrupter for isolating said conductor, of an impedance relay having current-responsive actuating and voltage-responsive restraining windings, a load-presetting device comprising means for varying the effectiveness of said restraining winding in accordance with the current traversing said conductor, and a transient shunt connected in parallel with said current-responsive winding.

3. In an electric distribution system, a conductor, a circuit interrupter for disconnecting the conductor from the rest of the system and protective means for controlling the interrupter comprising an impedance relay, a directional relay and an overcurrent relay, all of said relays having windings adapted to be energized in accordance with the current traversing said circuit, said impedance relay having also a voltage-responsive restraining winding, means controlled jointly by said impedance and directional relays and individually by said overcurrent relay for tripping said interrupter, and a load-presetting element responsive to said current for varying the effectiveness of said restraining winding.

4. A protective system for a feeder circuit including a circuit interrupter for isolating said circuit from its source of energy, means responsive to the apparent impedance of said circuit, means responsive to the direction of flow of energy therethrough, means responsive to the magnitude of the current traversing said circuit, and means controlled jointly by said first and second means and individually by said third means for effecting the tripping of said interrupter.

5. A protective system for a feeder circuit including a circuit interrupter for isolating said circuit from its source of energy, means responsive to the apparent impedance of said circuit, means responsive to the direction of flow of energy therethrough, means responsive to the magnitude of the current traversing said circuit, and means controlled jointly by said first and second means and individually by said third means for effecting the tripping of said interrupter, said third means comprising an instantaneous element and a time-delay element responsive to different values of said current.

6. The combination with a distribution circuit including a circuit interrupter for the circuit, of an impedance relay for controlling said circuit interrupter, said impedance relay having a current-responsive actuating winding and a voltage responsive restraining winding, and means responsive to the load current traversing said circuit during non-fault conditions for substantially proportionately varying the effectiveness of said restraining winding of the impedance relay of the same circuit during fault conditions.

7. The combination of an impedance relay having two separate magnetic circuits, means for energizing one of said magnetic circuits to actuate said relay toward its closed position, a voltage coil for energizing the other magnetic circuit to restrain said first-mentioned actuating means, a variable impedance device in the circuit of the voltage coil of said relay and current-responsive means for adjusting said impedance device.

8. In a protective equipment for a feeder circuit including a circuit interrupter, a relay having voltage and current windings, responsive to the apparent impedance of feeder circuit for controlling said interrupter, a rheostat in circuit with said voltage winding and current-responsive means for actuating said rheostat.

9. An adjusting device for a quick-acting impedance relay having current and voltage windings comprising a variable impedance associated with one of said windings and a slower-acting current-responsive device for varying said impedance.

10. A load presetter for a protective relay having two constantly operating, opposing, electromagnetic devices having an actuating winding and a restraining winding, an impedance associated with one of said windings and current-responsive means for varying the effectivenes of said impedance.

11. In an impedance relay, the combination with a pivoted armature and a plurality of electromagnets for controlling said armature, of a current winding on one of said magnets and voltage windings on others of said magnets and means for shifting the phase of the currents traversing one of said voltage windings.

12. In an impedance relay, the combination with a pivoted armature and a plurality of electromagnets for controlling said armature, of a current winding on one of said magnets and voltage windings on others of said magnets and means for shifting the phase of the currents traversing one of said voltage windings, said means comprising an impedance connected in series with one of said voltage windings.

13. A polar relay comprising a three-limb magnetic circuit, a pivoted armature for cooperation therewith, a polarizing winding divided on the outer limbs of said circuit and a directional winding having its main portion on the center limb of said circuit and auxiliary portions on the outer limbs.

14. A polar relay comprising a magnetic circuit, an armature for cooperation therewith, polarizing and directional windings on said circuit and means for preventing false operation of said relay as a result of the net flux in said circuit established by a phase displacement of the currents traversing said polarizing and directional windings.

15. The combination with a section of a feeder circuit adapted to be connected to substation busbars through isolating circuit breakers, of an instantaneous impedance relay and an overcurrent relay associated with each end of said section, for controlling said circuit breakers, said impedance relays being so adjusted as to be responsive only to faults occurring on said feeder within a predetermined distance from the ends thereof and means for interposing a slight time delay between the operation of said overcurrent relays and the consequent tripping of the circuit breakers, whereby faults occurring in the central portion of said section will be simultaneously isolated from both busbars by said circuit breakers under the control of said impedance relays and faults occurring near the ends of the section will be isolated from said busbars by the sequential tripping of said breakers under the control of the impedance relay nearer the fault and the overcurrent relay more distant therefrom, respectively.

16. In an electrical protective system for a distribution circuit including a plurality of sections connected to busbars at each end through isolating circuit breakers, the combination with an impedance relay for each breaker for controlling the latter on the occurrence of a fault of a predetermined impedance within a predetermined distance of said busbars, of an instantaneous overcurrent relay for each breaker and means for delaying the tripping of the breakers in response to operation of the overcurrent relays for a predetermined time greater than the time of operation of said impedance relay.

17. In a protective system for a distribution circuit including a plurality of sections connected to busbars at each end through isolating circuit breakers, means, including impedance relays, for simultaneously tripping the breakers at the ends of a faulty section without affecting the remaining breakers in response to a fault occurring within a predetermined distance of said busbars, and means, including an overcurrent relaying means with time delay, for tripping the breaker at one end of any one of said sections after the tripping of the breaker at the other end of that section in response to a fault located beyond the operating range of the impedance relay associated with said first-mentioned breaker.

18. A protective system for a power line comprising a plurality of line-sectionalizing interrupters, individual instantaneous distance-responsive and direction-responsive relay means jointly operative to open each interrupter and a delayed-action, overcurrent relay means operative to open an interrupter only after another interrupter closer to the fault has had time to operate in response to the latter's instantaneous relay means.

19. A protective system for a power line comprising a plurality of line-sectionalizing interrupters, and individual instantaneous distance-responsive relay means and direction-responsive relay means jointly operative to open each interrupter, said direction-responsive relay comprising an E-shaped core member having a centrally pivoted rocker-arm armature and having two windings energized, respectively, from the line current and from a source of polarizing alternating current of the same frequency, one of said windings being in two coils disposed on the two outer legs and so connected that one coil forms a north pole at substantially the same instant that the other forms a south pole at the free ends of the respective outer legs, the other of said windings being in three coils disposed on all three legs, respectively, the center-leg coil being the strongest, the two outer-leg coils last mentioned being opposed to, but normally less in strength than, the two coils of the first winding when current is flowing in one direction.

20. A single-phase railway system comprising a plurality of substations, a plurality of trolley feeder lines connected in parallel between two substations, each trolley feeder having a circuit-interrupter at each end, and individual instantaneous distance-responsive relay means and direction-responsive relay means jointly operative to open each interrupter, said direction-responsive relay comprising an E-shaped core member having a centrally pivoted rocker-arm armature and having two windings energized, respectively, from the line current and from a source of polarizing alternating current of the same frequency, one of said windings being in two coils disposed on the two outer legs and so connected that one coil forms a north pole at substantially the same instant that the other forms a south pole at the free ends of the respective outer legs, the other winding being in three coils disposed on all three legs, respectively, the center-leg coil being the strongest, the two outer-leg coils last mentioned being opposed to, but normally less in strength than, the two coils of the two-coil winding when the current is flowing in its normal direction from a substation into the line.

21. The combination with an electric power line, of a plurality of sectionalizing circuit-breakers therefor, an instantaneously operating, impedance-responsive relay for controlling each circuit-breaker, and a load-presenting device for each impedance-responsive relay for changing the setting of the latter in accordance with the load, said load-presetting device comprising a variable impedance, an induction-disk rotor for adjusting said variable impedance and a stationary magnetic element comprising current and voltage windings.

22. The combination with an electric power line, of a plurality of sectionalizing circuit-breakers therefor, an instantaneously operating, impedance-responsive relay for controlling each circuit-breaker, and a load-presetting device for each impedance-responsive relay for changing the setting of the latter in accordance with the load, said load-presetting device comprising a variable impedance, an induction-disk rotor for adjusting said variable impedance, and a stationary magnetic element comprising current and voltage windings, and means for altering the phase of one of said windings.

23. The combination with an electric power line, of a plurality of sectionalizing circuit-breakers therefor, an instantaneously operating, impedance-responsive relay for controlling each circuit-breaker, and a load-presetting device for each impedance-responsive relay for changing the setting of the latter in accordance with the load, said load-presetting device comprising a variable impedance and a volt-ampere responsive device having current and voltage windings and means for so varying the relative phases of said windings that they exert their maximum effect when the line current and voltage have substantially the phase relations expectable under fault conditions, and an induction-disk rotor responsive to said current and voltage windings and mechanically connected to said variable impedance to vary the same.

24. The combination with an electric power line, of a plurality of sectionalizing circuit-breakers therefor, an instantaneously operating, impedance-responsive relay for controlling each circuit-breaker, and a load-presetting device for each impedance-responsive relay for changing the setting of the latter in accordance with the load, said load-presetting device comprising current and voltage windings and means including a relatively slowly moving member actuated thereby and determining, by its position, the setting of the impedance-responsive relay.

25. The combination with an electric power line, of a plurality of sectionalizing circuit-breakers therefor, an instantaneously operating, impedance-responsive relay for controlling each circuit-breaker, and a load-presetting device for each impedance-responsive relay for changing the setting of the latter in accordance with the load, said load-presetting device comprising current and voltage windings and means including a relatively slowly moving member actuated thereby and determining, by its position, the setting of the impedance-responsive relay, and means for altering the phase of one of said windings.

26. The combination with an electric power line, of a plurality of sectionalizing circuit-breakers therefor, an instantaneously operating, impedance-responsive relay for controlling each circuit breaker, and a load-presetting device for each impedance-responsive relay for changing the setting of the latter in accordance with the load, said load-presetting device comprising current and voltage windings and means for so varying the relative phases of said windings that they exert their maximum effect when the line current and voltage have substantially the phase relations expectable under fault conditions, and means including a relatively slowly moving member actuated thereby and determining, by its position, the settings of the impedance-responsive relay.

27. An instantaneous directional alternating-current relay having two main current-windings, a movable contact-making element, and means for developing a force having a direction responsive to the relative directions of the currents in said windings and applying said force to move said contact-making element in the one direction or the other, dependent upon said relative directions of the currents, characterized by an auxiliary winding disposed in magnetic relation to one of said two main current-windings and electrically energized in accordance with the current traversing the other of said two main current-windings.

28. In an alternating-current electrical system comprising an alternating-current source of energy, a bus energized therefrom, a plurality of line-sections connected to said bus, circuit-interrupter means in each line-section adjacent to its point of connection to said bus, and instantaneous fault-distance-responsive relaying means associated with each line-section for opening its circuit-interrupter means adjacent to said bus, the combination, with said relaying means and circuit-interrupter means of each line-section, of an instantaneous directional alternating-current relay having two main current-windings, means for energizing one of said two main current-windings in accordance with the line-current of the line-section being protected, means for energizing the other of said two main current-windings in accordance with the bus currents, a movable contact-making element, and means for developing a force having a direction responsive to the relative directions of the currents in said windings and applying said force to move said contact-making element in the one direction or the other, dependent upon said relative directions of the currents, characterized by an auxiliary winding disposed in magnetic relation to one of said two main current-windings and electrically energized in accordance with the current traversing the other of said two main current-windings.

29. In an alternating-current electrical system comprising an alternating-current source of energy, a bus energized therefrom, a plurality of line-sections connected to said bus, circuit-interrupter means in each line-section adjacent to its point of connection to said bus, and instantaneous fault-distance-responsive relaying means associated with each line-section for opening its circuit-interrupter means adjacent to said bus, the combination, with said relaying means and circuit-interrupter means of each line-section, of an instantaneous directional alternating-current relay having two main current-windings, means for energizing one of said two main current-windings in accordance with the line-current of the line-section being protected, means for energizing the other of said two main current-windings in accordance with the bus current, a movable contact-making element, and means for developing a force having a direction responsive to the relative directions of the currents in said windings and applying said force to move said contact-making element in the one direction or the other, dependent upon said relative directions of the currents, characterized by an auxiliary winding disposed in magnetic relation to the bus-current-excited main current-winding and electrically energized in accordance with the current traversing the other of said two main current-windings.

30. The invention as recited in claim 29, in which the auxiliary winding opposes the flux of the bus-current-excited main current-winding when the current is flowing from said bus into said line-section and when the directional-relay contacts are to be closed.

31. A quick-acting fault-distance-responsive protective relay for controlling a circuit-interrupter in an electric power line, said relay comprising actuating-winding means and opposed restraining-winding means responsive to the current and voltage conditions of the power line being protected, and a relatively sluggishly acting means responsive to the amount of load carried by said power line during non-fault conditions for substantially proportionately varying the effectiveness of one of said winding means of the protective relay in said power line during fault conditions whereby the relay responds to faults up to a greater apparent distance from the relay when the non-fault load is large than when the non-fault load is small.

LESLIE N. CRICHTON.
HERBERT C. GRAVES.
MERRICK R. FELDMANN.